US010075843B1

(12) United States Patent
Schuler et al.

(10) Patent No.: US 10,075,843 B1
(45) Date of Patent: Sep. 11, 2018

(54) VALIDATION SERVICE PORTAL FOR WIRELESS LOCATION MANAGEMENT

(71) Applicant: SPRINT COMMUNICATIONS COMPANY L.P., Overland Park, KS (US)

(72) Inventors: John R. Schuler, Atlanta, GA (US); Rodney Dewaine Nelson, Overland Park, KS (US); Michael Patrick McMullen, Leawood, KS (US); Geetha R. Thati, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/454,425

(22) Filed: Aug. 7, 2014

Related U.S. Application Data

(63) Continuation of application No. 14/017,973, filed on Sep. 4, 2013, now Pat. No. 8,855,307, which is a (Continued)

(51) Int. Cl.
*H04W 12/02* (2009.01)
*H04W 4/02* (2018.01)
(Continued)

(52) U.S. Cl.
CPC ........... *H04W 12/02* (2013.01); *H04L 63/083* (2013.01); *H04W 4/001* (2013.01); *H04W 4/02* (2013.01); *H04W 4/50* (2018.02)

(58) Field of Classification Search
CPC ...................................................... H04W 4/02
See application file for complete search history.

(56) References Cited

U.S. PATENT DOCUMENTS

| 8,934,015 B1 * | 1/2015 | Chi .................... H04L 29/06476 |
| | | 348/158 |
| 2005/0043042 A1 * | 2/2005 | Hwang ................. H04W 64/00 |
| | | 455/456.2 |

(Continued)

FOREIGN PATENT DOCUMENTS

WO      2005051033 A1     6/2005

OTHER PUBLICATIONS

Advisory Action, dated Feb. 25, 2013, in U.S. Appl. No. 12/142,631, 3 pp.

(Continued)

*Primary Examiner* — Simon P Kanaan

(57) ABSTRACT

A method, system, and medium are provided for validating the identity or authority of a user of a wireless device to consent to providing geographic locations of their respective wireless device to a third-party application. Upon receiving a request to validate the authority of a user to consent to providing of geographic locations, the user is automatically redirected to a validation service portal. The validation service portal verifies the identity or authority of the user to consent by requiring the user to provide identification information. The identification information is compared to identification information in one or more databases to determine if the user has the authority to consent. An indication is provided by the validation service portal to the third-party application of whether the user has the authority to consent. The third-party application then initiates location-based services based on the indication.

9 Claims, 5 Drawing Sheets

Related U.S. Application Data continuation of application No. 12/142,631, filed on Jun. 19, 2008, now Pat. No. 8,565,430.

(51) Int. Cl.
  *H04L 29/06* (2006.01)
  *H04W 4/00* (2018.01)
  *H04W 4/50* (2018.01)

(56) References Cited

U.S. PATENT DOCUMENTS

| | | | |
|---|---|---|---|
| 2005/0125493 A1* | 6/2005 | Chaskar | H04L 29/06 709/203 |
| 2008/0039059 A1 | 2/2008 | Mullen | |
| 2013/0316311 A1* | 11/2013 | England | G09B 19/167 434/65 |

OTHER PUBLICATIONS

Final Office Action, dated Dec. 18, 2012, in U.S. Appl. No. 12/142,631, 17 pp.

Non Final Office Action, dated May 29, 2012, in U.S. Appl. No. 12/142,631, 70 pp.

"How to Redirect Browser Requests in Internet Information Services 5.0", Available at: http://support.microsoft.com/kb/313074, Microsoft, (2013), 5 pp.

"Using User Authentication", Available at: http://www.apacheweek.com/features/userauth, redhat, (Oct. 18 1996), 6 pp.

Notice of Allowance, dated Jun. 18, 2013, in related case U.S. Appl. No. 12/142,631, 30 pp.

First Action Interview, dated Mar. 10, 2014, in related case U.S. Appl. No. 14/017,973, 12 pp.

Notice of Allowance, dated May 27, 2014, in related case U.S. Appl. No. 14/017,973, 22 pp.

* cited by examiner

VALIDATION SERVICE PORTAL FOR WIRELESS LOCATION MANAGEMENT

PRIORITY

This application is a continuation of U.S. patent application Ser. No. 14/017,973, filed Sep. 4, 2013, which is a continuation of U.S. patent application Ser. No. 12/142,631, filed Jun. 19, 2008, each of which are hereby incorporated by reference in their entirety.

BACKGROUND

Wireless devices and associated network components are often able to determine a geographic location of the wireless device. Various methods such as Global Positioning System (GPS), triangulation, or user self-reported location can be employed to determine the geographic location of a wireless device. Services can then be provided to a user of the wireless device that require the use of the wireless device's geographic location. As the user self-reported location may be unreliable or burdensome for a user to keep up to date it does not provide adequate results. The geographic location of the wireless device provided by GPS or triangulation can be more reliable then in the providing of location-based services. However, users often have concerns over the sharing the geographic location of their wireless devices with third parties that provide location-based services.

SUMMARY

The invention is defined by the claims below. A high-level overview of embodiments of the invention is provided here for that reason, to provide an overview of the disclosure. In a first embodiment, a method of validating the identity of a user of a wireless device to establish that the user is an authorized user under a service agreement for the wireless device is provided. The method comprises receiving a request from a third-party application to validate the identity of the user of the wireless device, wherein the third-party application requires the use of a geographic location for the wireless device and consent of the user to utilize said geographic location. In turn, identification information is received from the user and compared to known identification information for the user. An indication is provided to the third-party application that the user is an authorized user under the service agreement of the wireless device when the received identification information is substantially similar to the known identification information for the user. An indication is provided to a third-party application that the user is not an authorized user under the service agreement of the wireless device when the received identification information differs from the known identification information for the user.

In a second embodiment, computer-readable media are provided for storing computer executable instructions for performing a method of validating the authority of a user to consent to providing geographic locations of a wireless device to a third-party application. The method comprises receiving a request from a user to initiate a third-party application, said third-party application requiring geographic location of a wireless device. The user is directed to a validation service portal to determine whether the user has authority to consent to the providing geographic locations associated with the wireless device to the third-party application. The third-party application is initiated if the user has authority to consent.

In a third embodiment, a system is provided according to an embodiment of the embodiment. The system comprises a wireless device configured to initiate a request for location-based services. A third-party application is configured to provide location-based services to the user of a wireless device, said services requiring the usage of the geographic location of the wireless device. A validation component is configured to validate the identity of a user of the wireless device to determine if the user has authority to consent to the providing geographic locations to the third-party application component. A communications network provides communication between the third-party application component and the validation component.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Embodiments of the invention provide systems, computer-readable media, and methods for validating the identity of a user of a wireless device to ensure that the user has authority to consent to release of geographic locations of the wireless device to third-party applications. After a user with authority consents, third-party applications can then use the geographic location to provide location-based services to the user of the wireless device. A validation service portal is used to verify the identity of the user and determine whether the user has authority to consent to release of geographic locations associated with the wireless device to the third-party applications.

Embodiments of the invention may include, among other things: a method, system, or computer-program product. Accordingly, the embodiments may take the form of a hardware embodiment, a software embodiment, or an embodiment combining software and hardware. In one embodiment, the inventions takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
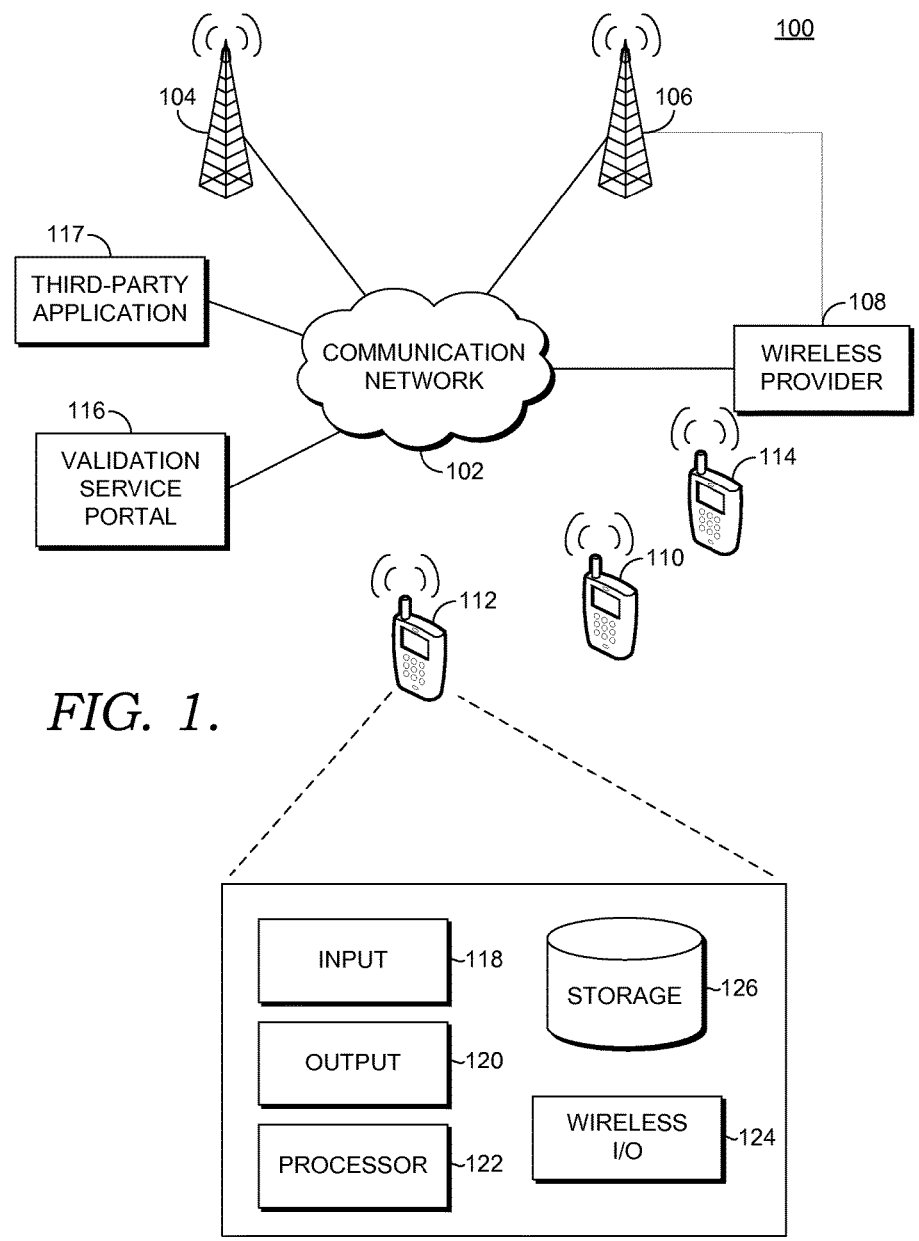
FIG. 1 depicts an exemplary network system in accordance with an embodiment of the invention.

Turning now to FIG. 1, a depiction of a wireless system 100 is presented, in accordance with an embodiment of the invention. The wireless system 100 includes communication network 102, which may be any type of network as known in the art, such as, but not limited to, the Internet, an intranet, a local area network (LAN), or a wide area network (WAN). As such networks are well known in the art, no further description will be provided. Base stations 104 and 106 are communicatively connected to the communication network 102 and provide for the communication between the wireless devices 110, 112, and 114 and the network 102 and, in turn, the wireless provider 108. Additionally, the wireless provider 108 may communicatively coupled to either or both of the base stations 104 and 106. While multiple wireless devices 110, 112, and 114 are depicted in FIG. 1, further mention will only be made to wireless device 112 for the sake of clarity. Third-party application 117 and validation service portal 116 are communicatively connected to the network 102, as well.

Wireless provider 108 can be any wireless service provider that provides wireless communication services to a user of wireless device 112. The wireless service can be provided under the terms of a service agreement between the user of a wireless device 112 and the wireless provider 108. The service agreement can specify the types of wireless services that will be provided to the user through their respective wireless device. The service agreement can also provide information that serves to identify both the user and the wireless device. The information can also include identification information on a plurality of users associated with one or more wireless devices, all of which are served by a single service agreement. In this manner, only certain users may have the authority to consent to the providing of geographic locations associated with the wireless device 112 to third-party application 117.

Validation service portal 116 provides for the determination of the identity of a user of a wireless device 112, and in turn the authority of the user to consent to the providing of geographic location for the wireless device 112 to a third-party application 117. Validation service portal 116 may also be referred to as a privacy consent web portal. As described above, different users under a single service agreement may have differing levels of authority. In those instances, the validation service portal 116 can require additional information from the user to particularly differentiate the user from the other users served under the single service agreement. The additional information could include portions of personally identifiable information, such as portions of a user's social security number, a user's driver's license number, or a user's date of birth. In some embodiments, personally identifiable information can be used to identify a user to the validation service portal 116 without use of the wireless device number.

For the remainder of the detailed description, it will be assumed that only one user is a party to the service agreement, and that once the identity of the user is verified, the authority of the user to consent to providing of geographic locations of the wireless device 112 to third-party applications 117 is thereby established. In other words, once the identity of the user is verified, the user is known to possess the requested authority to consent to the release of geographic locations for their respective device to third-party applications 117.

The validation service portal 116 can be administered by the wireless provider 108 and communicate with the wireless provider 108 over the network 102. Additionally, while the validation service portal 116 is shown in FIG. 1 as being separate from the wireless provider 108, the validation service portal 116 can be located within the wireless provider 108.

Third-party application 117 can be any application that uses the geographic location of the wireless device 112 to provide location-based services to the wireless device 112, and in turn to a user of said device. These services can be, for instance, mapping services, friend-locator services that let users keep track of their friend's location, or any other application that provides services based on the geographic location of the wireless device.

Wireless devices 112 can be defined as a plurality of types of devices, such as: cell phones, smart phones, PDAs, or any other computing device that is capable of wireless communication. This definition includes laptop computers that have wireless communication capabilities.

While only two base stations 104 and 106 and three wireless devices 110, 112, and 114 are depicted, it should be understood that a multitude of base stations and wireless devices may be utilized according to embodiments of the embodiment. The simplified depiction of the wireless system 100 in FIG. 1 is provided to aid in the understanding of the concepts of embodiments of the embodiment and is not intended to be limiting in nature.

Wireless device 112 includes an input component 118, an output component 120, a processor component 122, a storage component 126, and a wireless input/output (I/O) component 124. Input component 118 provides for the input of information in the wireless device 112. Input component 118 can take the form of a keypad, microphone, keyboard, selection device, mouse, track ball, or any other forms that provides for the input of information into the wireless device.

Output component 120 provides for the output of information from the wireless device 112. Output component 120 can take the form of components for the output of visual, audible, vibratory, or other forms of information. Visual forms of the output component 120 can take the form of an LCD display, plasma display, or any other display method that provides for the presentation of visual information to a user of the wireless device 112.

Processor component 122 provides computer processing functionality for the wireless device 112. Processor component 122 serves to control the functioning of the wireless device 112 and the functioning of the components that make up the wireless device 112.

Storage component 126 provides for the storage of information on the wireless device 112. It can take the form of a hard disk drive, differing types of computer memory, or any other suitable computer storage media. Common to all types of storage components 126 is the ability to store computer executable instructions.

Wireless I/O component 124 provides for the communication of wireless device 112 with the network 102 through base stations 104 and 106. Wireless I/O component 124 can take many forms, such as a receiver and transmitting module, for the reception of radio frequency waves and generation of the same. Common to all forms of wireless I/O 124 components is the ability to send and receive communications wirelessly.

Figure 2:
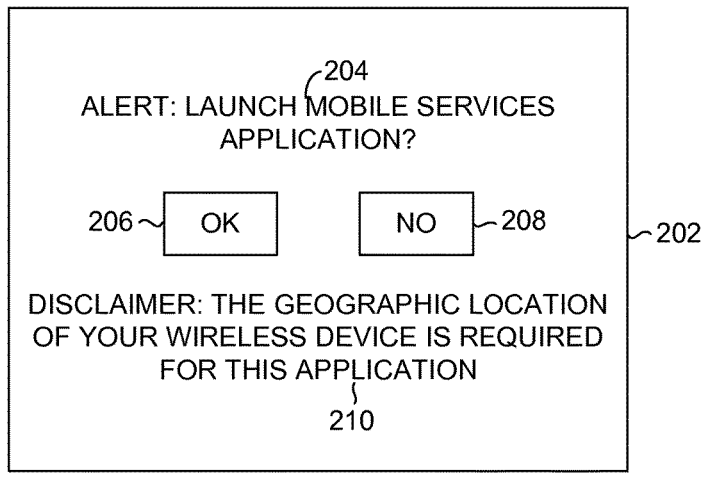
FIG. 2 depicts an exemplary screen shot of a user interface, according to an embodiment of the invention.

With reference now to FIG. 2, an exemplary screen shot of a user interface is depicted, in accordance with an embodiment of the embodiment. User interface 202 is a typical embodiment of an output component of a wireless device. Alert 204 can be presented at the user interface 202 of the wireless device when a user has attempted to initiate a location-based service provided by a third-party application. Upon receiving the request to initiate the location-based service, the third-party application communicates to the wireless device the alert 204 to present to the user of the wireless device through the output component. The alert 204 serves to solicit an affirmative or negative response from the user as to whether they desire to launch the third-party application. A user can provide an affirmative response by selecting the affirmative response button 206, or can provide a negative response by selecting the negative response button 208. The user can effectuate these selections through the input component on the wireless device. Once the response is received by the wireless device, it can be communicated to the base stations through the communications network to the third-party application. Upon receiving an affirmative response, the third-party application can direct the user interface of the wireless device to the validation service portal. This direction can occur automatically, without any further action required of the user of the wireless device.

Disclaimer 210 serves to notify the user of the wireless device that the geographic location of the wireless device is required for the application. This can aid the user in deciding whether they desire to provide an affirmative or negative response. The content of the disclaimer 210 can vary considerably, and according to some embodiments of the invention may not even be utilized by the third-party application.

While specific mention has been made to text-based alerts, other forms are contemplated, such as audio- or video-based alerts. In addition, a user can indicate their response to the alert through an audible input to the input component, and voice recognition techniques can be utilized to determine the content of the audible input.

Figure 3:
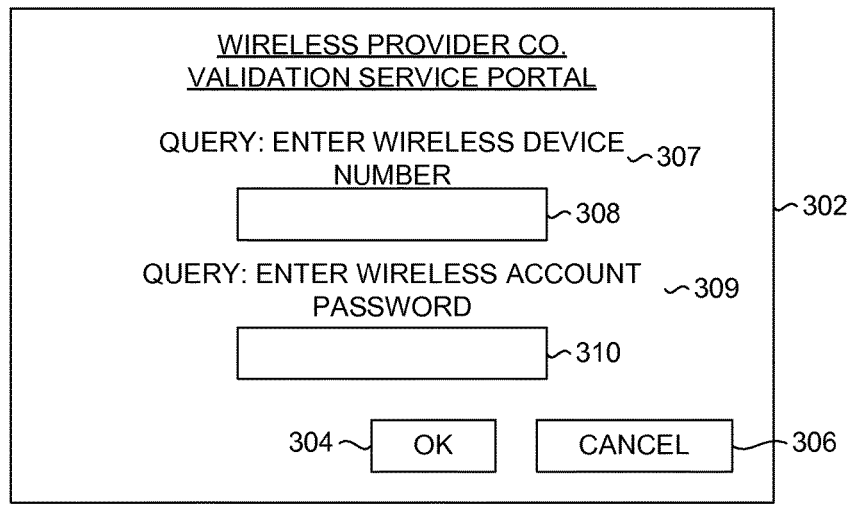
FIG. 3 depicts an exemplary screen shot of a user interface, according to an embodiment of the invention.

Turning now to FIG. 3, an exemplary screen shot of a user interface is provided, in accordance with an embodiment of the embodiment. User interface 302 is a typical embodiment of an output component of a wireless device. The user interface 302 is presented to a user of the wireless device when accessing the validation service portal. As described above, once an affirmative response is received to launch a third-party application that provides location-based services to a user of wireless device, the user interface of a wireless device can be directed to a validation service portal.

The validation service portal provides the role of verifying the identity and therefore the authority of the user to consent to the providing of geographic location to third-party applications. Unauthorized users are therefore not permitted to consent to the providing of geographic locations of wireless devices to third-party applications. A user would therefore not be able to clandestinely initiate the use of a third-party application that provides location-based services on a wireless device for which they did not have the authority to do so.

The validation service portal serves to verify the identity or authority of the user of the wireless device to consent to the providing of geographic locations of the wireless device to a third-party application. The validation service portal accomplishes this verification by querying the user of the wireless device for information identifying the wireless device. In FIG. 3, this can be by way of the query 307, asking a user to enter the wireless device number into a response field 308. The wireless device number could be a telephone number associated with the wireless device, or any other number that would identify the device, such as a serial number of the device or an IP address of the wireless device.

The information solicited by the query 307 can be of any type that serves to identify the user to the wireless provider. In the examples above, a wireless device telephone number or serial number is provided to validate the identity of the user. In those examples, the numbers would be known by the wireless provider 108 to be associated to a particular user. The wireless provider 108 would determine this information by consulting any combination of the following: one or more databases, user account information, or the service agreement entered into between the user and the wireless provider.

Verification query 309 serves to solicit information from the user that only the user and the wireless provider 108 would know. In the example given in FIG. 3, verification query 309 solicits the wireless account password from the user. This is information that a user would likely keep confidential and not share with other users, and would serve as a tool to verify the identity of the user. The user can enter the information sought by the verification query 309 into the response field 310 of the user interface 302. The information solicited by the verification query 309 could also be dynamic. An example of this would be a verification query 309 that requires the user to identify the geographic location of their wireless device at some point in the past, such as 24 hours. Dynamic information of this type can be used in conjunction with the more static information such as a password to improve the level of security. Other embodiments of the invention may make use of only dynamic types of information for the verification query 309.

Upon entering the information solicited by the query 307 and the verification query 309 in the response fields 308 and 310, the user can then select the transmit icon 304 to send the information provided in the response fields 308 and 310 to the base stations and through the communication network to the validation service portal. The validation service portal then verifies the information received from the wireless device 112 against information contained in one or more databases maintained by the wireless provider. As described above, even though the validation service portal is shown as separate from the wireless provider in FIG. 1, the validation service portal can in fact be part of and/or operated by the wireless provider 108. Alternatively, the user can select the cancel icon 306 to end communication with the validation service portal and decline to provide any information entered into the response fields 308 and 310.

If the validation service portal determines that the information provided by the wireless device is substantially similar to the information contained in one or more databases maintained by the wireless provider 108, an indication will be provided to the third-party application that the user is an authorized user under the service agreement of the wireless device. The third-party application will therefore be permitted to use the geographic location of the wireless device to provide location-based services to the wireless device and associated user.

When determining if the information provided by the wireless device 112 is substantially similar to that contained in the one or more databases, different definitions can be implemented according to embodiments of the invention.

For instance, if the information provided by the wireless device differs only in the proper case of text, such as when the information provided by the wireless device is in lower case text while the information in the one or more databases contains text in upper case, the two could be considered to be substantially similar. This provides a compromise to aid the user in inputting the information in the wireless device, while still maintaining a level of security in the verification process conducted at the validation service portal. Other methods could be permitted as well, such as only requiring the entering of truncated information, such as the first five digits of the wireless device number, or the first four characters of the wireless account password. The definition of substantially similar could then be predefined by the validation service portal, wireless provider, or the under the terms of the service agreement.

Figure 4:
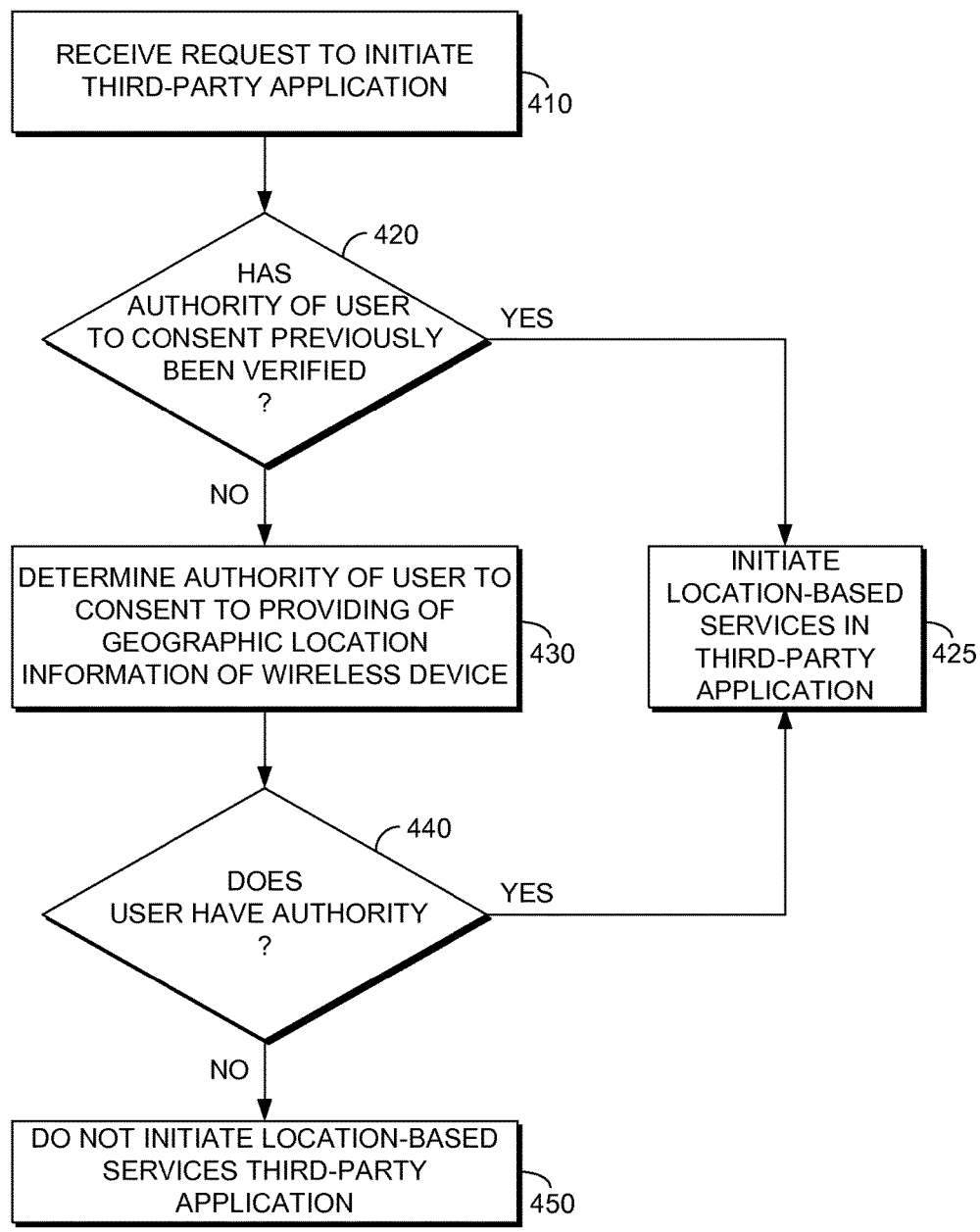
FIG. 4 depicts a flow diagram for initiating a third-party application in accordance with an embodiment of the invention.

With reference now to FIG. 4, a flow diagram is depicted of a method for initiating a third-party application in accordance with an embodiment of the invention. At block 410 when a request is received to initiate a third-party application. This request could be generated in response to the user seeking to launch a third-party application that provides location-based services. Additionally, it could be generated upon the issuance of an affirmative response as discussed in relation to FIG. 2, above. The request to initiate a third-party application can be received at the wireless provider, third-party application, validation service portal, or the wireless device.

Upon receiving the request detailed in block 410, a determination will be made by the validation service portal at block 420 of whether the authority of the user to consent to the providing of geographic location for their respective wireless device has previously been verified. To determine if the authority to consent has been verified previously, one or more databases maintained by the wireless provider can be consulted. Additionally, this information could be stored by the third-party application, validation service portal, or wireless device. The information could be in the form of a token or cookie, as is known in the art.

If the authority of the user to consent to the providing of geographic location for the wireless device has previously been verified, the method proceeds to block 425 and the location-based services provided by the third-party application are initiated. In these instances, the method can appear transparent to a user of the wireless device.

If the authority of the user to consent has not previously been verified, or if it has previously been determined that the user did not have the authority to consent, the authority of the user to consent to providing of geographic locations of the wireless device is determined in block 430. This can be accomplished through the use of the validation service portal, as described in detail in relation to FIG. 3.

The method proceeds to block 440, where if it was determined in block 430 that user had authority to consent, the location-based services provided by the third-party application are subsequently initiated in block 425. If, however, the user did not have authority to consent, the method proceeds to block 450 where the location-based services of the third-party application are not permitted to initiate.

Figure 5:
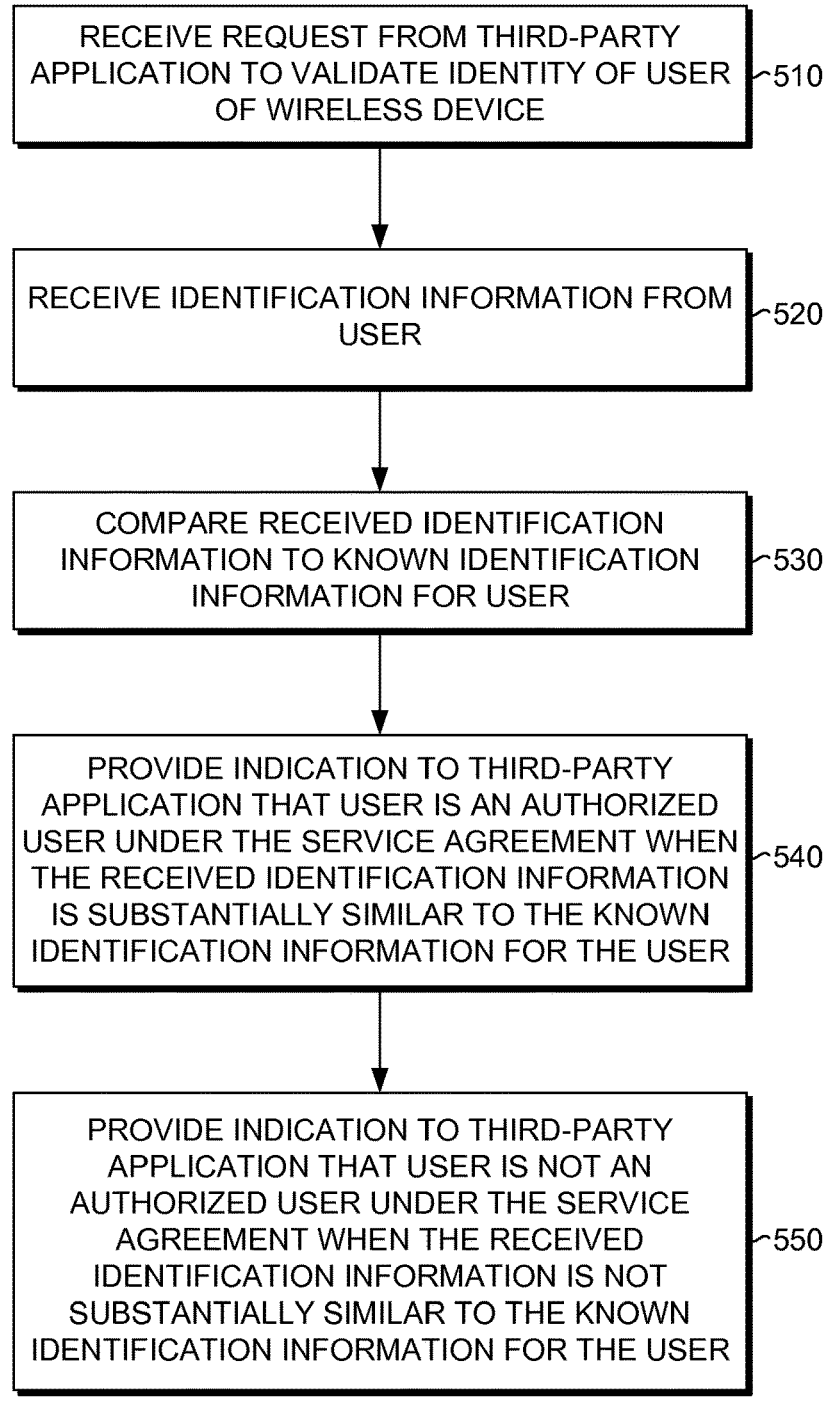
FIG. 5 depicts a flow diagram for validating the identity of a user of a wireless device in accordance with an embodiment of the invention.

Turning now to FIG. 5, a depiction of a flow diagram for validating the identity of a user of a wireless device in accordance with an embodiment of the invention is provided. In block 510 when a request is received from a third-party application to validate the identity of a user of a wireless device. The third-party application can require the use of information defining the geographic location of the wireless device and the consent of the user to utilize the information.

In block 520, identification information is received from the user in the validation service portal. The identification information can be received in the same manner as that described in relation to FIG. 3, above.

The received identification information is compared to known identification information for the user in block 530. The known identification information for the user can be stored in one or more databases maintained by the wireless provider. The validation service portal can consult those databases to compare the received identification information in block 520 to the known identification information contained in the databases. This permits the validation service portal to determine if the user of the wireless device has the authority to consent to the providing of geographic location for the wireless device to the third-party application. For instance, a user is requested to provide their wireless device number and wireless account password. The validation service portal then compares that information to that contained in the one or more databases. The databases could contain an entry for each wireless device number. For that entry, additional information could be stored, such as a wireless account password, date of birth of the user, or identifying information. By comparing the wireless account password provided by the user to validation service portal to the wireless account password corresponding to the wireless device number provided by the user, the validation service portal can verify the identity of the user and establish their authority to consent. For example, if the wireless account passwords match, or are substantially similar as defined above, the user can be deemed to have authority to consent.

At block 540, an indication is provided to the third-party application that the user is an authorized user under the service agreement of the wireless device when the received identification information is substantially similar to the known identification information for the user. The indication can be referred to as a redirections command and can take the form of one or more characters in a header, or any other form of communication to the third-party application. Additionally, the user can be redirected by the validation service portal to the third-party application after the successful verification in block 530. Included in the redirection command issued by the validation service portal can be the indication that the user is an authorized user under the service agreement and is authorized to consent to the release of geographic information to the third-party application.

In block 550, an indication is provided to the third-party application by the validation service portal that the user is not an authorized user under the service agreement of the wireless device when the received identification information is not substantially similar to the known identification information for the user. As in block 540, the indication can take the form of one or more characters in a header, or any other form of communication to the third-party application.

Figure 6:
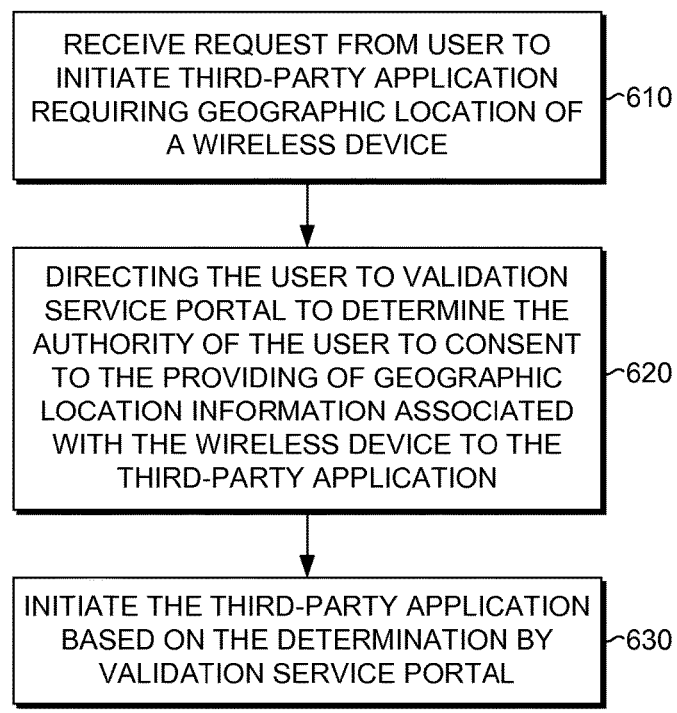
FIG. 6 depicts a flow diagram for validating the authority of a user to consent to the providing of geographic location describing the location of a wireless device to a third-party application.

With reference now to FIG. 6, a flow diagram is depicted for validating the authority of a user to consent to providing of geographic locations of a wireless device to a third-party application in accordance with an embodiment of the invention. In block 610 the receiving of a request from a user to initiate location-based services provided by a third-party application. The third-party application can require the use of geographic location for the wireless device to provide location-based services to the user. The request can be received when users confirm their desire to initiate the location-based services provided by the third-party application. Alternatively, the request to initiate location-based services can be communicated to the, without the intermediate confirmatory process described in FIG. 2.

At block 620, the user is directed to a validation service portal to determine the authority of the user to consent to the providing of geographic locations associated with the wireless device to the third-party application. The validation service portal verifies the identity of a user of a wireless device as being associated with the wireless device to establish that the user has authority to consent.

In block 630, the location-based services provided by the third-party application are initiated based on the determination by the validation service portal. If the validation service portal determines that a user has the necessary authority to consent to the providing of geographic locations, an indication can be communicated to the third-party application over the communication network through base stations. If the validation service portal determines that the user does not have authority to consent to the providing of geographic locations, an indication of such can be communicated to the third-party application in the same manner.

Many different arrangements of the various components depicted, as well as components not shown, are possible without departing from the spirit and scope of the embodiment. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the embodiment.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer system comprising a wireless input/output component, a third-party application component, and a validation component, configured by a hardware processor to execute the following:
   initiating, by the wireless input/output component, a request for location-based services from a third-party application, the location-based services requiring the usage of geographic location information of a wireless device associated with a first user;
   receiving, from the third-party application component, a request for the geographic location information of the wireless device associated with the first user;
   validating, by the validation component, an identity of the first user associated with the wireless device to determine if the first user has the authority to consent to provide the geographic location information to the third-party application the validating comprising:
      providing, by the validation component, a verification user interface portal to a second user that includes a request for:
         identification information of the second user, the identification information comprising at least one of a social security number, a driver's license number, or a date of birth of the second user, and identification information for the wireless device associated with the first user, the identification information comprising at least one of a wireless number, an internet protocol address, or a serial number of the wireless device;
      receiving, by the validation component, the identification information for the second user and the identification information for the wireless device associated with the first user; and
      validating, by the validation component, an identity of the second user and an identity of the wireless device associated with the first user based on the identification information of the second user and the identification information of the wireless device associated with the first user being compared to stored information associated with each of the second user and the first user;
      determining, by the validation component, based on the identification information of the second user, the identification information of the wireless device associated with the first user, and the stored information, that the second user has given the first user the authority to allow access to geographic location information of the wireless device to enable the location-based services of the third-party application,
   wherein the second user is different than the first user, the second user is a member of a group account that has the authority to authorize the first user to provide the geographic location information to the third-party application, and the first user is a member of the group account.

2. The system of claim 1, wherein the stored information comprises at least one of:
   a service agreement between the user and a wireless provider, and
   a user account associated with a wireless provider.

3. The system of claim 1, further comprising:
   determining, by the validation component, an authority level of the first user to determine if the authority level is sufficient to permit the first user to allow access to the geographic location information of the wireless device to enable the location-based services; and
   indicating to the third-party application that the authority level of the first user is sufficient to allow access to the geographic location information to enable the location-based services.

4. The system of claim 1, further comprising providing, by the third-party application component, an indication to the third-party application that the first user has the authority to allow access to the geographic location information of the wireless device to enable the location-based services.

5. The system of claim 1, wherein the second user is a member of a group account that allows the second user to enable the third-party application to access geographic location information of other wireless devices associated with the group account based on the second user's authority level with the group account.

6. A computer-implemented method for controlling location-based services from third-party applications, the method comprising:
   initiating a request for location-based services from a third-party application, the location-based services requiring the usage of geographic location information of a wireless device associated with a first user;
   receiving, from the third-party application, a request for the geographic location information of the wireless device associated with the first user;
   validating that the first user has the authority to consent to authorize the provision of geographic location information to the third-party application, the validating comprising:

providing a verification user interface portal to a second user that includes a request for:
  identification information of the second user, the identification information comprising at least one of a social security number, a driver's license number, and a date of birth of the second user, and
  identification information of the first wireless device associated with the first user, the identification information comprising at least one of a wireless number, an internet protocol address, and a serial number of the wireless device associated with the first user;
receiving the identification information for the second user and the identification information for the wireless device associated with the first user;
validating an identity of the second user and an identity of the wireless device associated with the first user based on the identification information of the second user and the identification information of the wireless device associated with the first user being compared to stored information associated with each of the first user and the second user;
determining, based on the identification information of the second user, the identification information of the wireless device associated with the first user, and the stored information, that the second user has given the first user the authority to allow access to geographic location information of the wireless device to enable the location-based services of the third-party application;
receiving authorization, from the first user, to provide geographic location information to the third-party application; and
providing the geographic location information to the third-party application to enable the location-based services,
wherein the second user is different than the first user, the second user is a member of a group account having a higher authority level than the first user and has the authority to authorize the first user to provide the geographic location information to the third-party application.

7. The method of claim 6, wherein the stored information comprises a service agreement between the second user and a wireless provider.

8. The method of claim 6, wherein the stored information comprises a user account established between the second user and a wireless provider.

9. The system of claim 1, wherein the second user validates the first user after the first user requests to initiate the third-party application.

\* \* \* \* \*